(12) United States Patent
Nakayama

(10) Patent No.: US 8,805,961 B2
(45) Date of Patent: Aug. 12, 2014

(54) READING DEVICE AND COMMUNICATION SYSTEM

(75) Inventor: Hiroto Nakayama, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 569 days.

(21) Appl. No.: 12/689,606

(22) Filed: Jan. 19, 2010

(65) Prior Publication Data

US 2010/0185750 A1   Jul. 22, 2010

(30) Foreign Application Priority Data

Jan. 21, 2009   (JP) ................. 2009-011019

(51) Int. Cl.
G06F 15/16 (2006.01)
G06F 15/177 (2006.01)
G06F 15/173 (2006.01)
G06F 7/00 (2006.01)

(52) U.S. Cl.
USPC ........... 709/219; 709/203; 709/220; 709/223; 707/662

(58) Field of Classification Search
None
See application file for complete search history.

(56) References Cited

U.S. PATENT DOCUMENTS

| | | | |
|---|---|---|---|
| 2004/0117389 A1* | 6/2004 | Enami et al. | 707/100 |
| 2005/0277405 A1* | 12/2005 | Noguchi | 455/411 |
| 2006/0095514 A1 | 5/2006 | Wang et al. | |
| 2006/0155943 A1* | 7/2006 | Todd et al. | 711/161 |
| 2008/0074689 A1* | 3/2008 | Yamada et al. | 358/1.13 |
| 2008/0263297 A1 | 10/2008 | Herbst et al. | |

FOREIGN PATENT DOCUMENTS

| | | |
|---|---|---|
| JP | 6-46234 | 2/1994 |
| JP | 10-190996 | 7/1998 |
| JP | 2001-051820 A | 2/2001 |
| JP | 2004-253871 A | 9/2004 |
| JP | 2004-266456 A | 9/2004 |
| JP | 2006-85452 | 3/2006 |
| JP | 2008-085402 A | 4/2008 |
| JP | 2008-135870 | 6/2008 |

OTHER PUBLICATIONS

Notification of Reasons for Rejection mailed Nov. 30, 2010 in corresponding Japanese Patent Application No. 2009-011019, together with English language translation.
Extended European Search Report and Search Opinion dated Mar. 30, 2012 from related European Application No. 10250073.3.
Chinese Office Action dated Nov. 15, 2011 from related Chinese Application 201010004492.3, together with an English-language translation.
European Office Action dated Mar. 31, 2014 issued in the EP counterpart application No. 10250073.3.

* cited by examiner

Primary Examiner — Ranodhi Serrao
Assistant Examiner — Farrukh Hussain
(74) Attorney, Agent, or Firm — Scully, Scott, Murphy & Presser PC

(57) ABSTRACT

A reading device, comprising: a reading unit configured to read a document and to generate image data representing the read document; an uploading unit configured to upload the image data read by the reading unit to an server on a network; a storage time limit setting unit configured to set a storage time limit within which the image data is stored on the server; a judgment unit configured to judge whether the storage time limit has expired with respect to the image data uploaded on the server; and a data management unit configured to delete, from the server, the image data for which the judgment unit judges that the storage time limit has expired.

9 Claims, 9 Drawing Sheets

FIG. 3

(MANAGEMENT TABLE)

| | STORAGE TIME LIMIT | FILENAME | UPLOAD TARGET | EXTENSION RECEPTION TIME | LOGIN ID | PASSWORD | FILE FORMAT | MAIL ADDRESS | NOTIFICATION NUMBER |
|---|---|---|---|---|---|---|---|---|---|
| 1 | 2008/11/29 09:30 | 20081126001.tif | 192.168.0.10 | - | user001 | ******** | TIFF | *@******.jp | - |
| 2 | 2008/11/29 11:52 | 20081126002.tif | 192.168.0.10 | - | user001 | ******** | TIFF | *@******.jp | - |
| 3 | 2008/11/30 15:12 | 20081126003.jpg | 192.168.0.41 | - | user002 | ******** | JPEG | *@******.jp | - |
| 4 | EXPIRED | 20081126004.pdf | 192.168.0.42 | 60 minutes (2008/11/28 12:00) | user003 | ******** | PDF WITH PASSWORD | *@******.jp | 13542589 |
| 5 | 2008/12/01 10:29 | 20081127001.pdf | 192.168.0.10 | - | user003 | ******** | PDF | *@******.jp | - |
| 6 | 2008/12/02 17:01 | 20081127002.jpg | 192.168.0.41 | - | user002 | ******** | JPEG | *@******.jp | - |
| 7 | 2008/12/04 14:11 | 20081128001.pdf | 192.168.0.42 | - | user004 | ******** | PDF | *@******.jp | - |

Sever storage time limit of 20081126004.pdf has expired.
If re-upload is required, please access to a link indicated below.
If no instruction is received within 60 minutes, re-upload is not executed.

http:// (Address of MFP)/reupload.html?ID=13542589

FIG. 5

EXTENSION RECEPTION TIME SETTING TABLE

| FILE FORMAT | EXTENSION TIME RECEPTION TIME (MINUTES) |
|---|---|
| TIFF | 180 |
| JPEG | 120 |
| PDF WITH PASSWORD | 60 |
| PDF | 120 |

FIG. 6

RE-UPLOAD SETTING SCREEN

Please input new time limit.

| Time Limit | Filename |
|---|---|
|  | 20081126004.pdf |

Update  Cancel

FIG. 8

READING DEVICE AND COMMUNICATION SYSTEM

CROSS-REFERENCE TO RELATED APPLICATION

This application claims priority under 35 U.S.C. §119 from Japanese Patent Application No. 2009-011019, filed on Jan. 21, 2009. The entire subject matter of the application is incorporated herein by reference.

BACKGROUND

1. Technical Field

Aspects of the present invention relate to a reading device and a communication system in which a server and a reading device are connected to each other.

2. Related Art

Various types of communication systems in which a reading device transmits scanned image data representing a scanned document to a server have been widely used. One of such communication systems is configured such that scanned image data representing a scanned document is transmitted to an FTP (File Transfer Protocol) server, and a user is able to download the scanned image data from the FTP server. Such a function of the communication system is utilized when a user manages the scanned image data on the user's PC (Personal Computer) or a plurality of users share the scanned image data (i.e., the document).

SUMMARY

However, in the above described communication system, there is a possibility that the user forgets to delete the scanned image data uploaded to the FTP server and thereby unnecessary scanned image data remains on the FTP server.

Aspects of the present invention are advantageous in that at least one a reading device and a communication system capable of appropriately manage scanned image data is provided.

According to an aspect of the invention, there is provided a reading device, comprising: a reading unit configured to read a document and to generate image data representing the read document; an uploading unit configured to upload the image data read by the reading unit to an server on a network; a storage time limit setting unit configured to set a storage time limit within which the image data is stored on the server; a judgment unit configured to judge whether the storage time limit has expired with respect to the image data uploaded on the server; and a data management unit configured to delete, from the server, the image data for which the judgment unit judges that the storage time limit has expired.

According to another aspect, there is provided a communication system, comprising a server and the above described recording device which are connected to each other via a network.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3 is an explanatory illustration for explaining a structure of a management table.

FIG. 5 is an example of an e-mail to be transmitted in a data management process.

FIG. 6 illustrates an example of a data structure of an extension reception time setting table.

FIG. 8 is illustrates an example of a re-upload setting screen displayed on an access source device.

DETAILED DESCRIPTION

Hereafter, an embodiment according to the invention will be described with reference to the accompanying drawings.

Figure 1:
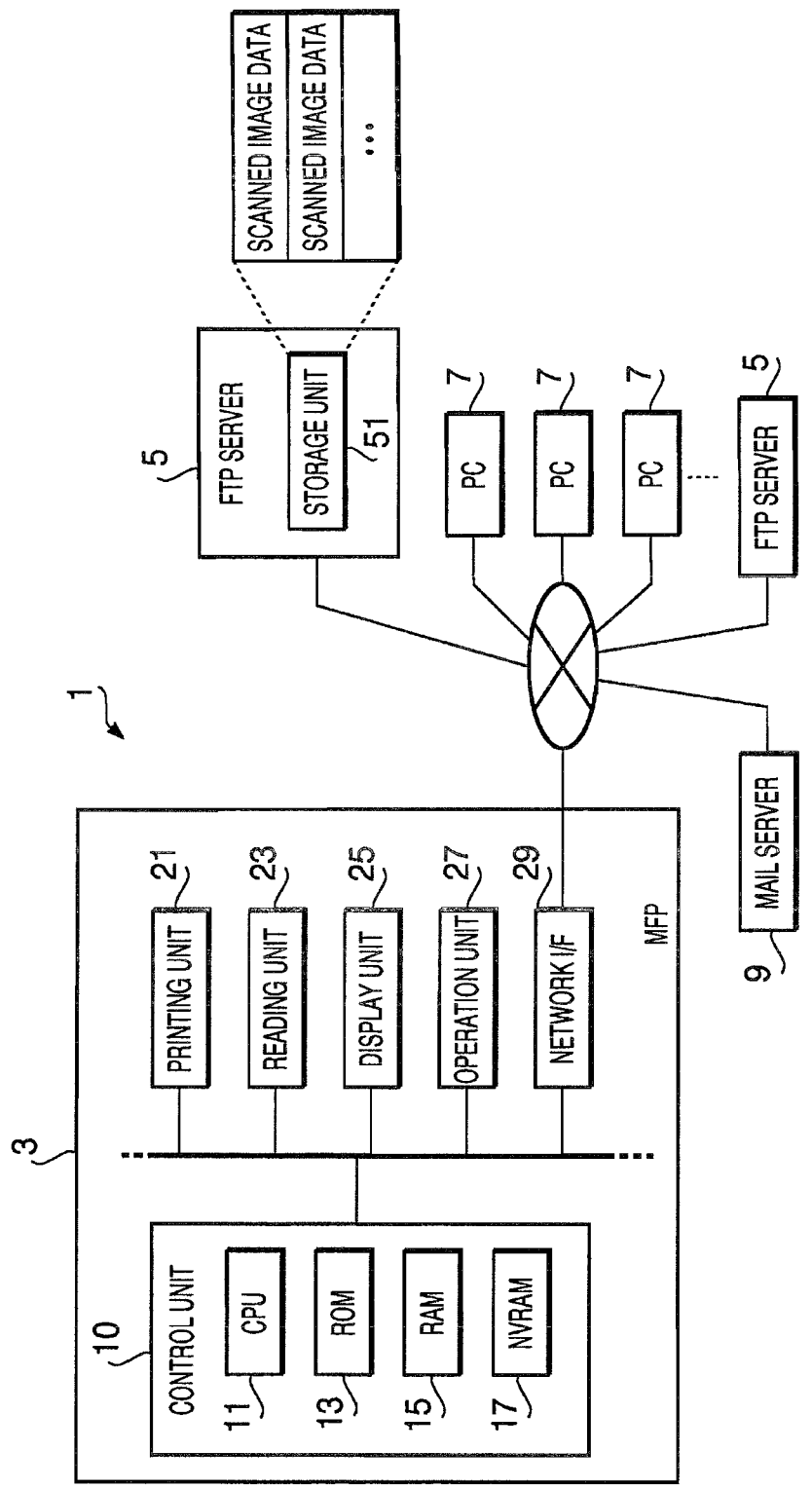
FIG. 1 is a block diagram illustrating a configuration of a communication system according to an embodiment.

As shown in FIG. 1, a communication system 1 according to the embodiment includes a digital multifunction peripheral (hereafter, abbreviated as an MFP) 3, FTP servers 5, PCs (Personal Computers) 7 and a mail server 9 which are connected to each other via a network.

The MFP 3 has multiple functions including a network printer function, a scanner function and a copy function. More specifically, the MFP 3 includes a control unit 10, a printing unit 21, a reading unit 23, a display unit 25, an operation unit 27 and a network interface 29.

The control unit 10 includes a CPU 11, a ROM 13 storing programs to be executed by the CPU 11, a RAM 15 used as a work memory for execution of the programs by the CPU 11, and an NVRAM 17 (e.g., a flash memory or an EEPROM) which is a rewritable nonvolatile memory. Through execution of the program, the control unit 10 totally controls the components of the MFP 3 to realize the network printer function, the scanner function and the copy function.

The printing unit 21 has a configuration as a general printer, and is configured to pick up a sheet of paper from a paper supply tray (not shown), and to form, on the sheet of paper, an image based on target image data. The reading unit 23 has a configuration as a general scanner. Under control of the control unit 11, the reading unit 23 optically reads a document placed on a document base (not shown), generates image data (hereafter, referred to as scanned image data) representing an image of the document, and then inputs the scanned image data to the control unit 10.

The display unit 25 is, for example, a liquid crystal display. Under control of the control unit 10, the display unit 25 displays various types of data. The operation unit 27 includes operation keys to be operated by a user. The operation unit 27 obtains operation information inputted through the operation keys by the user, and inputs the operation information to the control unit 10.

The network interface 29 receives data addressed to the MFP 3 from the network, and inputs the received data to the control unit 10. Further, the network interface 29 transmits transmission data passed from the control unit 10, to the network. For example, the network interface 29 transmits the scanned image data generated by the reading unit 23 by reading the document, to the FTP server 5 which is a server device on the network so that the scanned image data is uploaded to the FTP server 5.

The scanned image data uploaded to the FTP server 5 is stored in a storage unit 51 (e.g., a hard disk drive) of the FTP server 5. The scanned image data stored in the storage unit 51 of the FTP server 5 is utilized, for example, by being downloaded by the PC 7.

Figure 2:
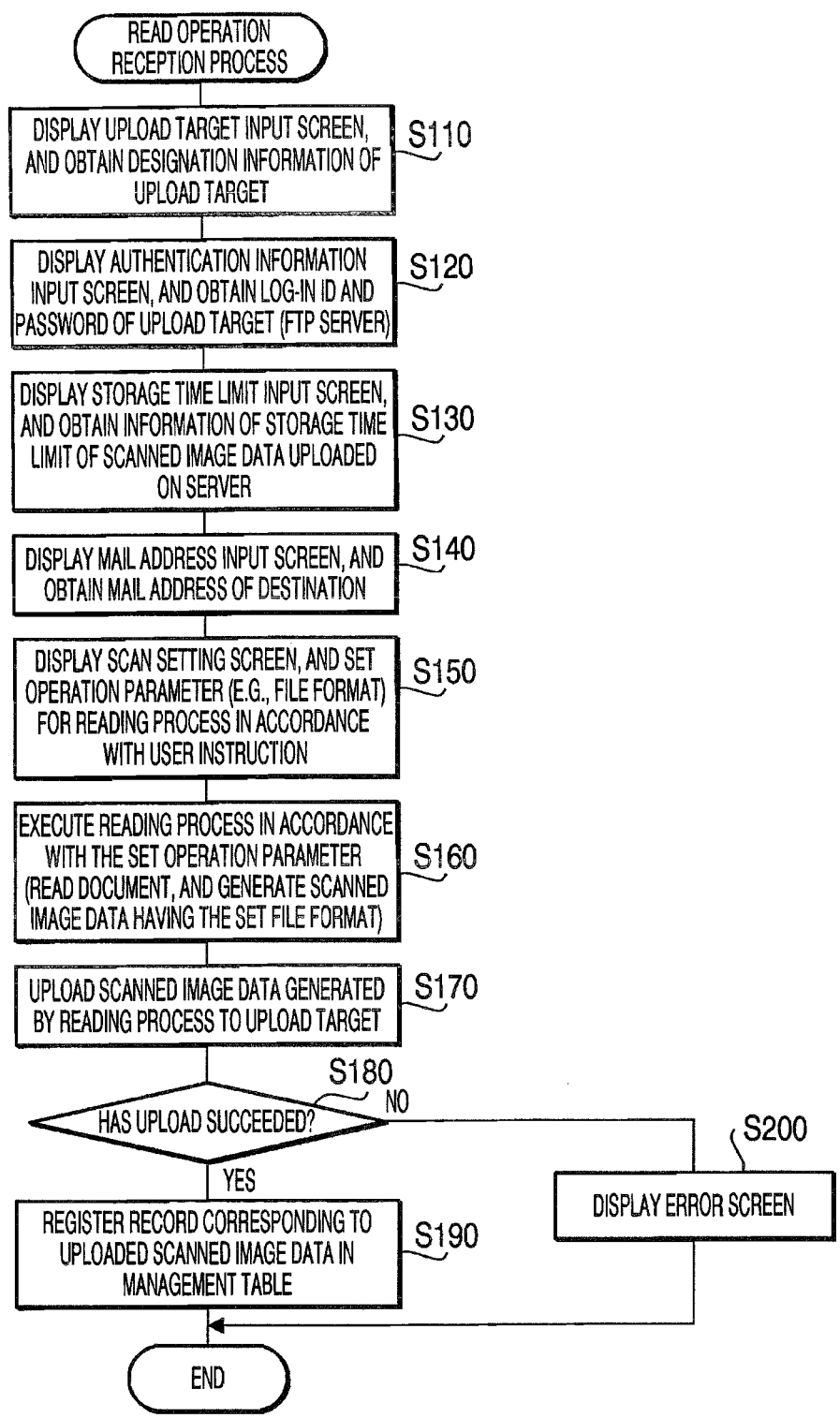
FIG. 2 is a flowchart illustrating a read operation reception process executed by a multifunction peripheral.

Such a function of uploading scanned image data from the MFP 3 to the FTP server 5 is achieved by executing a read operation reception process shown in FIG. 2 by the control unit 10. The read operation reception process shown in FIG. 2 is executed when a read command operation for executing reading of the document is inputted through the operation unit 27.

When the read operation reception process is started, the control unit 10 displays an upload target input screen for requesting the user to designate an upload target through the operation unit 27 (step S110). In this case, the control unit 10 displays a screen through which the user is able to input an address of the FTP server 5 to which the scanned image data is to be uploaded, so as to obtain address information of the FTP server 5.

Alternatively, the control unit 10 may display, as the upload target input screen, a selection screen through which the user is able to select one of servers (FTP servers 5) based on address information concerning a plurality of FTP servers 5 stored in advance in the NVRAM 17. That is, the control unit 10 obtains, through the operation unit 27, selection information of the FTP server 5 by the user, as designation information of an upload target.

When the control unit 10 obtains the designation information of an upload target, the control unit 10 displays an authentication information input screen requesting the user to input a log-in ID and a password for logging-in the FTP server 5 (an upload target). Therefore, the control unit 10 obtains information concerning the log-in ID and the password from the user (step S120). In this case, the control unit 10 displays, as the authentication information input screen, a screen through which the user is able to input an log-in ID and a password to be transmitted to the FTP server 5 when the scanned image data is uploaded to the FTP server 5 so that the information concerning the log-in ID and the password can be obtained from the user.

After the information concerning the log-in ID and the password is obtained, control proceeds to step S130. It should be noted that some of servers (FTP servers 5) do not need a log-in ID and a password when the scanned image data is uploaded. Therefore, when an operation for terminating the inputting operation is conducted through the operation unit 27, the control unit 10 may tentatively judge that the information concerning a log-in ID and a password is obtained. In this case, control proceeds to step S130.

In step S130, the control unit 10 displays a storage time limit input screen on the display unit 25 to request the user to input information concerning the storage time limit of the scanned image data through the operation unit 27. The information concerning the storage time limit represents an expiration date and time for storing the scanned data on the upload target (the FTP server 5).

More specifically, the control unit 10 displays, on the display unit 25, the storage time limit input screen through which the user is able to input year, month, day, time, minute as the storage time limit. When a date and time later than the present date and time is inputted as the storage time limit, the control unit 10 judges that a proper storage time limit is inputted. In this case, control proceeds to step S140. On the other hand, a date and time earlier than the present date and time is inputted as the storage time limit, the control unit 10 displays a message requesting the user to input a proper storage time limit on the display unit 25. When a proper storage time limit is inputted, control proceeds to step S140.

In step S140, the control unit 10 displays a mail address input screen on the display unit 25 so that when the scanned image data is deleted from the FTP server 5 due to expiration of the storage time, information concerning a mail address to which such a fact is notified can be obtained from the user through the operation unit 27.

When the information concerning the mail address is obtained, the control unit 10 displays a scan setting screen for receiving various types of setting operations regarding a reading process. In accordance with the setting operation conducted by the user through the operation unit 27, the control unit 10 sets operation parameters for the reading process (step S150).

More specifically, a scaling factor (reduction and enlargement), a reading resolution, a file format of scanned image data are set as operation parameters, for example. The MFP 3 is configured to be able to generate the scanned image data having a TIFF format, a JPEG format, a PDF format, or a PDF with a password format. The scan setting screen is configured such that the user is allowed to input a password to be used for the PDF with a password format.

When reception of the setting operation is completed, the control unit 10 executes the reading process in accordance with the operation parameters set in step S150 (step S160). More specifically, in the reading process, the control unit 10 controls the reading unit 23 in accordance with the operation parameters to read the document placed on the document base and to generate the scanned image data representing the read image of the document. Furthermore, by converting the image obtained by the reading unit 23 into the scanned image data having the set file format, the control unit 10 generates the scanned image data having the file format designated by the user.

When the reading process is finished, control proceeds to step S170. In step S170, the control unit 10 uploads the scanned image data having the above described file format to the upload target (the FTP server 5) designated by the user in accordance with the designation information of the upload target obtained in step S110. It should be noted that when uploading the scanned image data, the control unit 10 accesses the FTP server 5 using the log-in ID and the password of the upload target obtained in step S120.

When the upload has succeeded (S180: YES), the control unit 10 newly registers a record corresponding to the uploaded scanned image data in a management table (step S190). Then, the read operation reception process terminates. As described in detail later, the management table is stored in the NVRAM 17.

When the scanned image data can not be successfully uploaded to the upload target (i.e., the scanned image data) due to a fact that the designated FTP server 5 does not exist or a fact that the control unit 10 was not able to access the FTP server 5 due to a wrong password (S 180: NO), the control unit 10 displays a error screen on the display unit 25 (step S200). Then, the read operation reception process terminates.

Hereafter, the record to be registered in the management table in step S190 is explained with reference to FIG. 3.

As shown in FIG. 3, each record has ten fields (first to tenth field). In the first field, an index number is described. In the second field, the storage time limit of the scanned image data on the FTP server 5 is described. In the third field, a filename of the scanned image data is described. In the fourth field, information (an address of the FTP server 5) concerning the upload target of the scanned image data is described. In the fifth field, an extension reception time indicating a time period within which the control unit 10 accepts a request for re-upload of the scanned image data from the time when the scanned image data is deleted from the FTP server 5 due to expiration of the storage time is described. In the sixth field, a log-in ID required for accessing the upload target is described. In the seventh field, a password required for accessing the upload target is described. In the eighth field, a file format of the scanned image data is described. In the ninth field, a mail address to which, when the scanned image data is deleted on the FTP server 5, such a fact is notified is described. In the tenth field, a notification number issued when such a notification is sent is described.

That is, in step S190, the control unit 10 registers, in the management table, the record in which an index number, the storage time obtained in step S130, the filename of the scanned image data uploaded in step S170, the address of the upload target, the log-in ID used for access to the FTP server, the password used for access to the FTP server 5, the file format of the uploaded scanned image data, the mail address obtained in step S140 are written to the first to ninth fields, respectively. In this case, the field of each of the fifth and tenth fields is defined as empty data.

Figure 4:
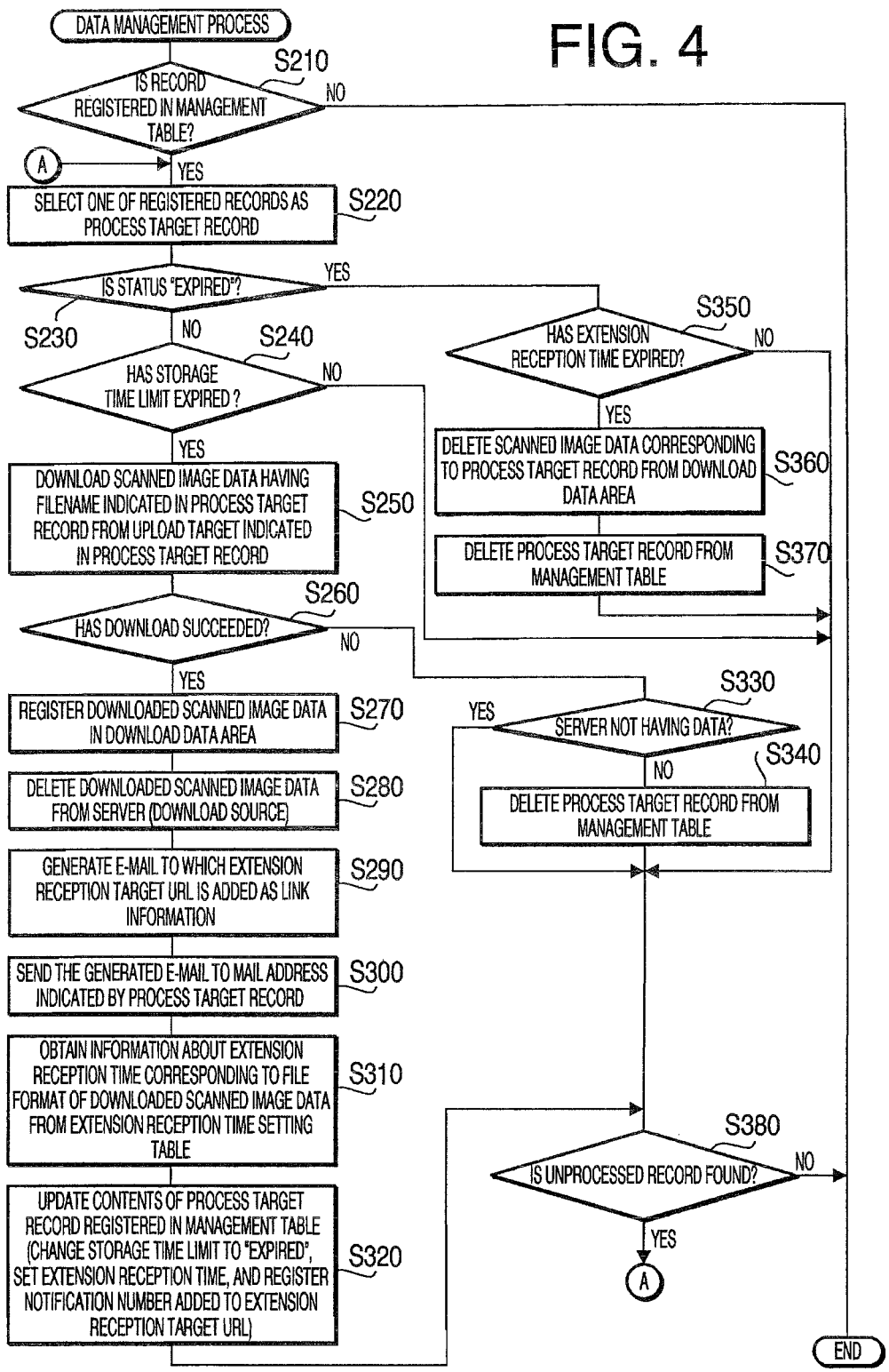
FIG. 4 is a flowchart illustrating a data management process to be executed by the multifunction peripheral.

Hereafter, a data management process periodically executed by the control unit 10 during power-on of the MFP 3 is explained with reference to FIG. 4. As described below, by executing the data management process, the control unit 10 manages the scanned image data uploaded to the FTP server 5.

When the data management process is started, first, the control unit 10 judges whether a record is registered in the management table (step S210). When no record is registered in the management table (S210: NO), the data management process terminates.

On the other hand, when a record is registered in the management table (S210: YES), control proceeds to step S220 where the control unit 10 selects one of the records registered in the management table as a process target record. Then, control proceeds to step S230.

In step S230, the control unit 10 judges whether the process target record is in an expired status by referring to the second field (i.e., the storage time limit) of the process target record.

Through step S230, when the storage time limit is expired, a code indicating expiration is written into the second field in place of the storage time limit in each of the records of the management table. That is, in step S230, the control unit 10 judges whether the process target record is in the expired state by judging whether the code indicating expiration is described in the second field of the process target record.

When the control unit 10 judges that the process target record is in the expired state (S230: YES), control proceeds to step S350. On the other hand, when the process target record is not in the expired state (S230: NO), control proceeds to step S240.

In step S240, the control unit 10 judges whether the storage time limit of the scanned image data of the process target record on the FTP server 5 has expired by referring to the second field of the process target record. More specifically, the control unit 10 judges whether the storage time limit has expired by judging whether the storage time limit described in the second filed is earlier than the present date and time.

When the control unit 10 judges that the storage time limit has not expired (S240: NO), control proceeds to step S380 where the control unit 10 judges whether an unprocessed record which has not been selected as the process target record in this time around execution of the data management process remains in the management table. When an unprocessed record exists (S380: YES), control returns to step S220 where one of the unprocessed records is selected as the process target record and steps from step S230 are executed.

On the other hand, when the storage time limit of the process target record is earlier than the present date and time and the storage time lime has expired (S240: YES), control proceeds to step S250. In step S250, the control unit 10 accesses the FTP server 5 as the upload target indicated in the process target record, and downloads the scanned image data having the filename designated by the process target record (step S250).

When the control unit 10 judges that the download has succeeded (S260: YES), the control unit 10 writes the downloaded scanned image data in a download data area of the NVRAM 17 (step S270), and deletes the scanned image data from the FTP server 5 (the download source) (step S280).

Next, the control unit 10 generates an e-mail in which an extension reception target URL which is an URL of a webpage accepting an operation for re-upload is described as link information (step S290). Then, the control unit 10 sends the e-mail to the mail address indicated by the process target record through the mail server 9 (step S300).

As shown in FIG. 5, the e-mail to be notified in step S300 to a user of a destination device of the mail address includes a message indicating that the storage time limit has expired and therefore the scanned image data has deleted from the FTP server 5.

Furthermore, in step S290, the control unit 10 adds a notification number unique to the current processes target record (ID=12542589 in the example of FIG. 5) to the extension reception target URL so that when the user clicks the link information in the e-mail on the destination of the e-mail (e.g. the PC7), the notification number is sent to the link target web server as a URL parameter. As a result, a web page unique to the scanned image data corresponding to the current process target record is displayed on the reception target of the e-mail.

Incidentally, when the e-mail is generated in step S290, the control unit 10 generates randomly a notification number within a numeric range of unused numbers. Furthermore, the MFP 3 has a web server function, and therefore a URL for accessing the web page of the MFP 3 is described in step S290 as the extension reception target URL.

After thus finishing steps S290 and S300, control proceeds to step S310 where the control unit 10 judges the file format of the scanned image data downloaded in step S250, and obtains information concerning the extension reception time corresponding to the file format of the scanned image data downloaded in step S250 from an extension reception time setting table stored in the NVRAM 17.

As shown in FIG. 6, in an extension reception time setting table stored in the NVRAM 17, information concerning an extension reception time to be set to the scanned image data for each of the file formats of the scanned image data is stored.

More specifically, in the example of FIG. 6, the PDF format with a password is assigned the extension reception time shorter than those of the other file formats. The reason is that if the user selects the PDF format with a password, there is a high possibility that the document to be read has a higher degree of confidentiality, and therefore it is necessary to firmly prevent leaking of the information concerning the document.

As described above, the extension reception time is a time that elapses before reception of the re-uploaded is finished. The MFP 3 holds the downloaded scanned data in the download data area, and after reception of re-download is finished, the MFP 3 deletes the downloaded scanned image data from the download data area, and then deletes the scanned image data from both of the MFP 3 and the FTP server 5.

In other words, until the extension reception time has elapsed, the scanned image data is held on the MFP 3 even if the scanned image data is deleted from the FTP server 5. Therefore, the longer the extension reception time becomes, the higher the possibility that the information concerning the document leaks through the scanned image data held on the download data area of the MFP 3. For this reason, according to the embodiment, the extension reception time setting table is configured such that data having a higher degree of confidentiality has a shorter extension reception time.

After the control unit 10 obtains the extension reception time corresponding to the file format of the currently downloaded scanned image data, control proceeds to step S320. In step S320, the control unit 10 updates the contents of the process target record registered in the management table.

More specifically, the control unit 10 writes "expired" in the second field of the process target record to change the status of the process target record to the expired state. Further, the control unit 10 writes information concerning the extension reception time obtained in step S310 and the information concerning the present date and time which is an extension reception start date and time in the fifth field of the process target record. Furthermore, the control unit 10 writes the notification number added to the e-mail in step S290 to update the process target record.

After thus finishing step S320, control proceeds to step S380 where the control unit 10 judges whether an unprocessed record is found in the management table. When an unprocessed record is found (S380: YES), control returns to step S220 to select one of the unprocessed record as a process target record and to execute steps from S230. When no unprocessed record is found (S380: NO), the data management process terminates.

When the download of the scanned image data has failed in step S260 (S260: NO), the control unit 10 judges whether the failure of the download is caused by the fact that the corresponding scanned image data is not stored in the FTP server 5 (step S330). When the failure of the download is caused by the fact that the corresponding scanned image data is not stored in the FTP server 5 (S330: NO), the control unit 10 deletes the process target record from the management table (step S340). Then, control proceeds to step S380.

When the failure of the download is not caused by the fact that the corresponding scanned image data is not stored in the FTP server 5 (e.g., when the FTP server 5 is down and therefore the control unit 10 can not access the FTP server 5) (S330: YES), control proceeds to step S380 without processing S340.

When the control unit 10 judges that the process target record is in the expired status (S230: YES), control proceeds to step S350 where the control unit 10 judges whether the extension reception time has elapsed based on the information concerning the extension reception time and the extension reception start date and time written in the fifth field of the process target record. That is, the control unit 10 judges whether the extension reception time has elapsed by judging whether the date and time obtained by adding the extension reception time to the extension reception start date and time is earlier than the present date and time.

When the control unit 10 judges that the extension reception time has elapsed (S350: YES), the control unit 10 deletes the scanned image data corresponding to the process target record from the download data area (step S360). Further, the control unit 10 deletes the process target record from the management table (step S370). Then, control proceeds to step S380. On the other hand, when the control unit 10 judges that the extension reception time has not elapsed (S350: NO), control proceeds to step S380 without processing steps S360 and S370.

After all the records registered in the management table have been selected as the process target records and steps from S230 have been processed for the selected process target records, judgment result in step S380 becomes "NO". Then, the data management process terminates. After a lapse of a certain time, the data management process is executed again.

Figure 7:
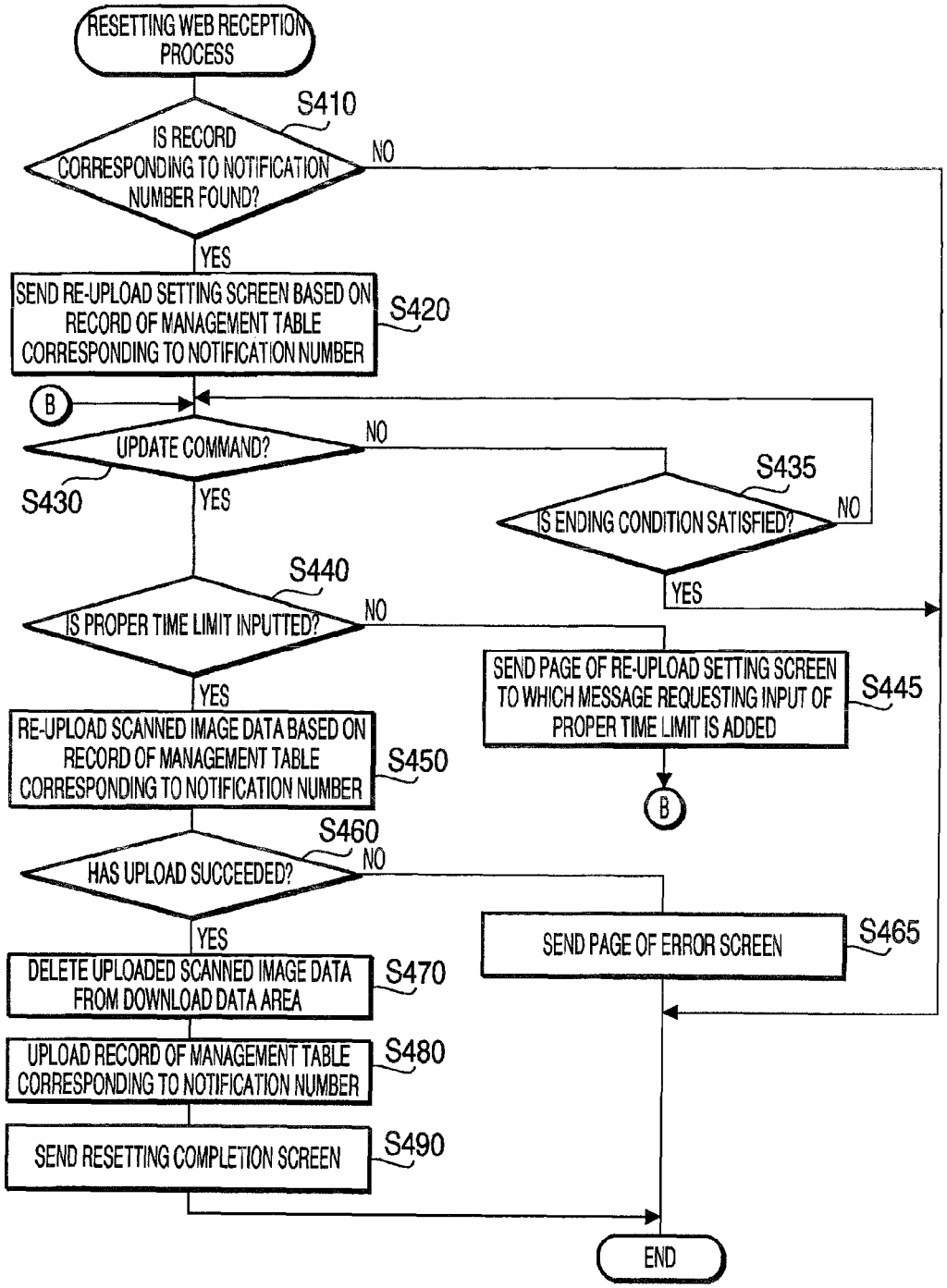
FIG. 7 is a flowchart illustrating a resetting web reception process executed by the multifunction peripheral.

Hereafter, a resetting web reception process is explained with reference to FIG. 7. The MFP 3 is configured to be able to serve as a web server, and the control unit 10 executes the resetting web reception process as one of functions of the web server.

When the resetting web reception process is started, the control unit 10 searches the management table for a record associated with the notification number received as the URL parameter from an access source device (i.e., the PC7), and judges whether such a record is registered in the management record (step S410). When the record is not found in the management table (S410: NO), the resetting web reception process terminates.

When the record is found in the management table (S410: YES), control proceeds to step S420 where the control unit 10 generates a web page forming a re-upload setting screen dedicated for the scanned image data corresponding to the searched record, and transmits the generated web page to the access source device.

As shown in FIG. 8, a re-upload setting screen displayed on the access source device includes an input field for a storage time limit to be set for the scanned image data to be re-uploaded, an update button and a cancel button.

When the update button is pressed in a state where the storage time limit has been inputted to the input field, an update command and information concerning the storage time limit to be newly set are transmitted from the access source device to the MFP 3. On the other hand, when the cancel button is pressed, a cancel command is transmitted from the access source device to the MFP 3.

Therefore, after transmitting the above described web page to the access source device, the control unit 10 receives the update command, receives the information concerning the storage time limit inputted to the input field, or waits until a predetermined waiting time has elapsed (step S430 and S435).

When the cancel command is received or the waiting time has elapsed without receiving the update command or the cancel command, the control unit 10 judges that an ending condition is satisfied (S435: YES). In this case, the resetting web reception process terminates.

On the other hand, when the update command is received (S430: YES), control proceeds to step S440 where the control unit 10 judges whether the storage time limit inputted through the re-upload setting screen is proper based on the information concerning the storage time limit received together with the update command. That is, the control unit 10 judges whether the inputted storage time limit is later than the present date and time.

When the control unit 10 judges that the inputted storage time limit is not proper (S440: NO), control proceeds to step S445 where the control unit 10 transmits, to the access source device, the web page for the re-upload setting screen to which a message requesting for input of a proper time limit is added. Then, control proceeds to step S430.

On the other hand, when the control unit 10 judges that the inputted storage time limit is proper (S440: YES), control proceeds to step S450. In step S450, based on the record which is associated with the notification number received from the access source device in the management table, the control unit 10 reads the scanned image data having the filename indicated by the record from the download data area of the NVRAM 17, and uploads the scanned image data to the FTP server 5 indicated by the upload target in the record.

When the upload has succeeded (S460: YES), the control unit 10 deletes the uploaded scanned image data from the download data area of the NVRAM 17 (step S470), and updates the above described record associated with the notification number received from the access source device in the management table (step S480).

More specifically, the control unit 10 updates the storage time limit of the scanned image data by writing the information concerning the storage time limit newly received from the access source device together with the update command in the second field, and deletes the information in the fifth and tenth fields. Thus, the above described record is updated. Then, reception of the re-upload is finished.

Then, the control unit 10 transmits a web page forming a resetting completion screen to the access source device so that the resetting completion screen having a message indicating that the re-upload has finished is displayed on the access source device and is notified to the user (step S490). Then, the resetting web reception process terminates.

When the upload has failed (S460: NO), the control unit 10 transmits a web age forming an error screen indicating failure of re-upload, to the access source device (step S465). Then, the resetting web reception process terminates.

The resetting web reception process for accepting the uploading operation from the destination device of the e-mail has been described with reference to FIG. 7; however, the MFP 3 according to the embodiment is configured to accept an uploading operation through the operation unit 27.

Figure 9:
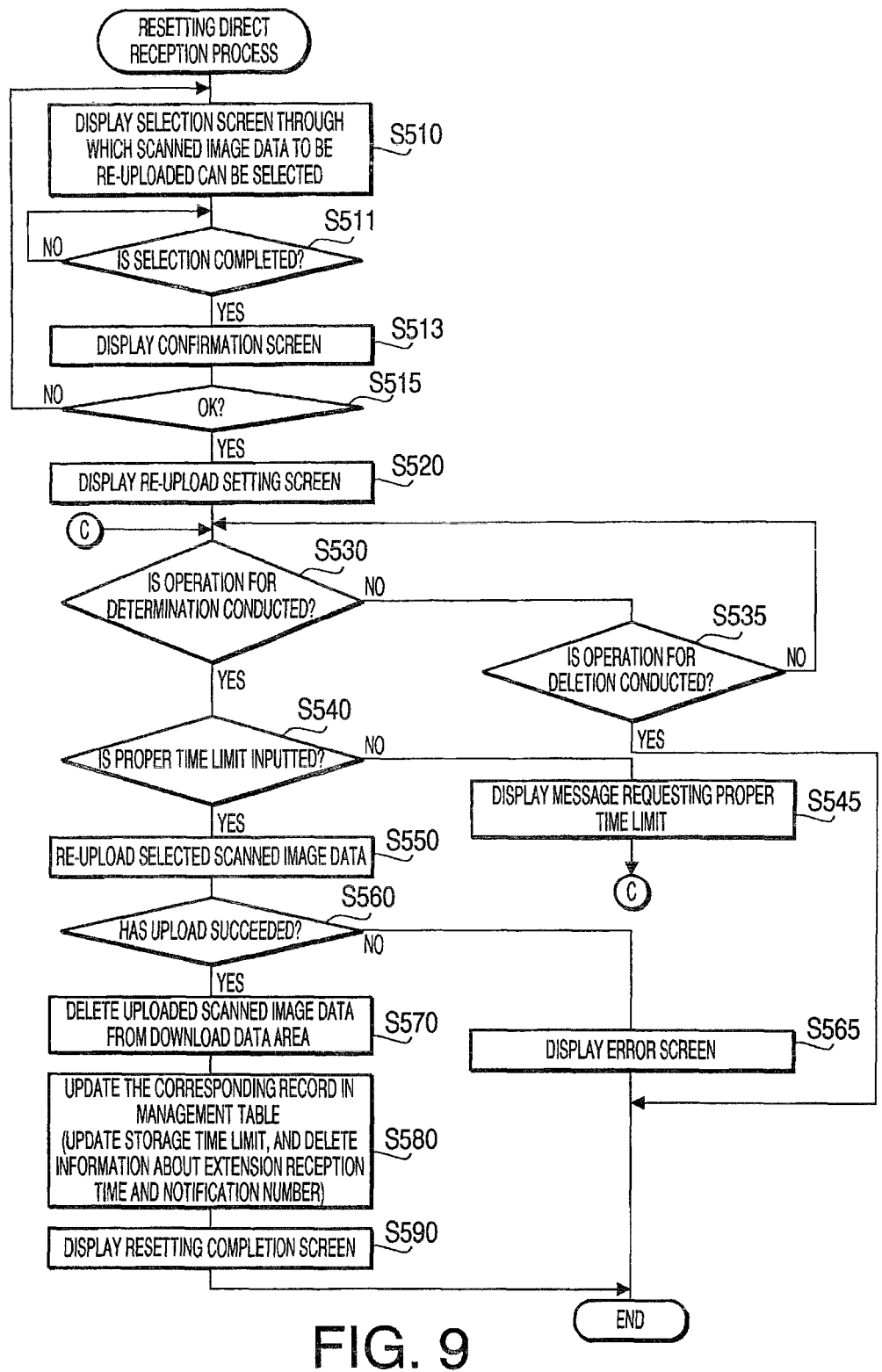
FIG. 9 is a flowchart illustrating a resetting direct reception process executed by the multifunction peripheral.

Hereafter, a resetting direct reception process is explained with reference to FIG. 9. As described in detail below, the resetting direct reception process is executed under control of the control unit 10 of the MFP 3 when a display command for displaying a selection screen through which the user is able to select the scanned image data to be re-uploaded is inputted through the operation unit 27.

First, the control unit 10 displays, on the display unit 25, the selection screen through which the user is able to select the scanned image data to be re-uploaded (step S510).

More specifically, the control unit 10 forms the selection screen such that filenames of the scanned image data corresponding to the records having the expired status in the management table are listed, and one of the listed filenames can be selected by moving a cursor through the operation unit 27.

Figure 10A:
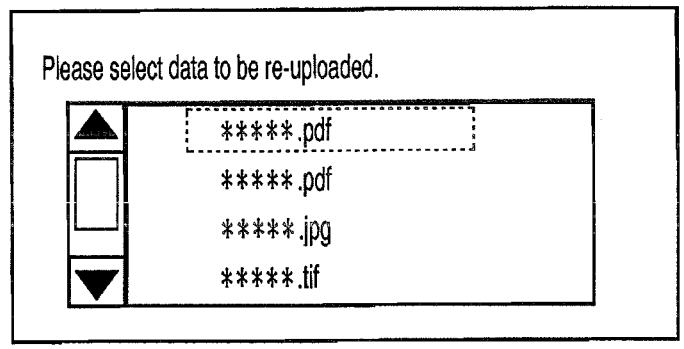
FIG. 10A illustrates an example of a selection screen displayed on the multifunction peripheral.
Figure 10B:
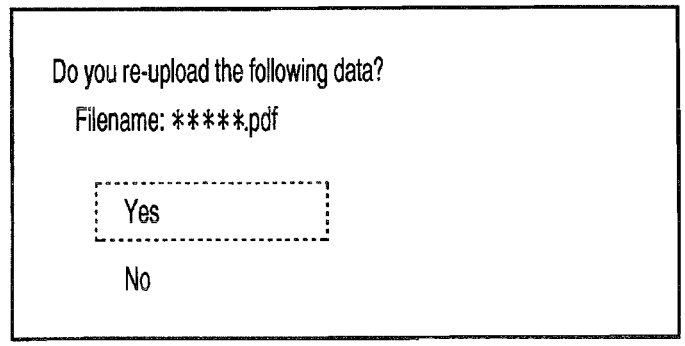
FIG. 10B illustrates an example of a confirmation screen displayed on the multifunction peripheral.

After the selection screen is displayed, the control unit 10 waits until user selection for selecting the scanned image data to be re-uploaded through the selection screen is finished. When an determination key provided on the operation unit 27 is pressed in the state where the cursor is placed on one of the filenames to be selected, the control unit 10 judges that the selection of the scanned image data has completed (S511: YES), and control proceeds to step S513. In step S513, the control unit 10 displays a confirmation screen for confirming whether proper scanned image data has been selected on the display unit 25 as shown in FIG. 10B (step S513).

After the confirmation screen is displayed, the control unit 10 waits until a user operation for confirming selection of the scanned image data to be re-uploaded is conducted through the confirmation screen or a user operation for deleting the scanned image data to be re-uploaded is conducted. When the user operation for confirming selection of the scanned image data to be re-uploaded is conducted (S515: YES), control proceeds to step S520. On the other hand, when the user operation for deleting the scanned image data to be re-uploaded is conducted (S515: NO), control returns to step S510 to display the selection screen again and to accept the user operation for selecting the scanned image data to be re-uploaded.

Figure 10C:
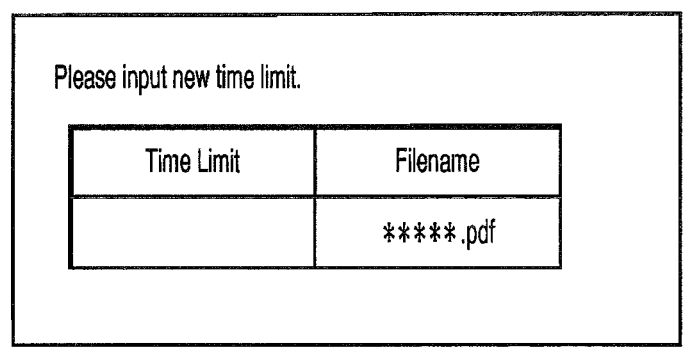
FIG. 10C illustrates an example of a re-upload setting screen displayed on the multifunction peripheral.

In step S520, the control unit 10 displays a re-upload setting screen on the display unit 25 as shown in FIG. 10C. Similar to the above described re-upload setting screen displayed as a web page, the re-upload setting screen displayed in step S520 includes an input field to which the storage time limit set for the scanned image data to be re-uploaded is to be inputted.

After displaying the re-upload setting screen on the display unit 25, the control unit 10 waits until the determination key provided on the operation unit 27 is pressed or the cancel key provided on the operation unit 27 is pressed (steps S530, S535). When the cancel key is pressed (S535: YES), the resetting direct reception process terminates.

When the determination key is pressed (S530: YES), control proceeds to step S540 where the control unit 10 judges whether the storage time limit newly inputted to the re-upload setting screen is proper. That is, the control unit 10 judges whether the storage time limit newly inputted is later than the present date and time.

When the control unit 10 judges that the storage time limit is not proper (S540: NO), the control unit 10 displays a message requesting input of a proper time limit on the display unit 25 (step S545). Then, control returns to step S530 to further wait until the determination key or the cancel key is pressed.

On the other hand, when the control unit 10 judges that the storage time limit is proper (S540: YES), control proceeds to step S550 where the control unit 10 reads the scanned image data selected through the selection screen from the download data area of the NVRAM 17, and uploads the read scanned image data to the FTP server 5 which is the upload target indicated by the record corresponding to the scanned image data.

When the upload has succeeded (S560: YES), the control unit 10 deletes the uploaded scanned image data from the download data area of the NVRAM 17 (step S570), and updates the record of the management table corresponding to the uploaded scanned image data as in the case of step S480 (step S580).

After step S580 is finished, the control unit 10 displays the resetting completion screen on the display unit 25 (step S590). Then, the resetting direct reception process terminates.

Hereafter, advantages achieved by the above described embodiment are described.

According to the communication system 1, the MFP 3 sets the storage time limit in accordance with the user instructions for each of pieces of the scanned image data to be uploaded, and deletes the scanned image data of which storage time lime has expired, from the FTP server 5. By thus managing the scanned image data uploaded on the FTP server 5, it becomes possible to prevent the scanned image data from remaining on the FTP server 5 for a long time even if the user forgets to delete the scanned image data from the FTP server 5.

Therefore, according to the embodiment, it is possible to appropriately manage, from the MFP 3 which is the uploading source device, the scanned image data stored on the FTP server 5, and to avoid occurrence of shortage of the storage capacity of the FTP server 5.

According to the embodiment, it is possible to prevent the user from being confused about which data should be downloaded due to the large amount of unnecessary scanned image data when the user tries to download the scanned image data from the FTP server 5 to the PC 7. Further, it is possible to prevent important information from leaking to a person who is not authorized to view the information due to the fact that the scanned image data is not deleted and therefore the scanned image data remains on the FTP server 5 for a long time.

According to the communication system 1, it is unnecessary to manage the storage time limit of the scanned image data on the FTP server 5. Therefore, it is not necessary to form the FTP server 5 as a special server dedicated for management of the storage time limit. As a result, it becomes possible to easily achieve a system capable of preventing the unnecessary scanned image data from remaining on the FTP server 5 for a long time.

According to the communication system 1, when the scanned image data is updated, the MFP requests the user to input the storage time limit, and sets the storage time limit in accordance with the user instructions. Therefore, in comparison with the case where the storage time limit is set automatically, it becomes possible to set an optimum storage time limit according to the degree of confidentiality of the scanned image data, and thereby to decrease the possibility of occurrence of leakage of information. Furthermore, it becomes possible to prevent the user from feeling inconvenience due to too short data storage time of the scanned image data on the FTP server.

According to the communication system 1, the scanned image data whose storage time limit has expired is saved tentatively from the FTP server 5 to the MFP 3 so that the scanned image data saved to the MFP 3 can be re-uploaded to the FTP server 5 without the need for conducting again the user operation for document reading. As a result, the storage time limit on the FTP server 5 can be extended through a simple user operation. Accordingly, it becomes possible to provide a system having excellent operability and having a high degree of usability.

In the above described communication system 1, the storage time (i.e., the extension reception time) within which the scanned image data saved from the FTP server 5 to the MFP 3 changes depending on the file format of the scanned image data. Further, when the storage time has expired, the saved scanned image data is deleted from the MFP 3.

More specifically, the storage time of the saved scanned image data on the MFP 3 is defined such that the storage time of the scanned image data having the PDF with a password format which would have the highest degree of confidentiality is the shortest storage time of 60 minutes, the storage time of the scanned image data having the TIFF format which is only able to describe a monochrome image and has a low degree of confidentiality is the longest storage time of 180 minutes, and the storage times of the scanned image data having the other types of formats are 120 minutes so that the reception time of the re-uploading operation is defined depending on the confidentiality of information. Therefore, according to the embodiment, it becomes possible to decrease the possibility of leakage of information as low as achievable.

According to the embodiment, the MFP notifies the user of the fact that the scanned image data is deleted from the FTP server 5 by an e-mail so as to enable the user to remotely conduct the user operation for setting the storage time limit or the re-upload operation from the user's terminal (PC 7) by adding the link information to the re-upload setting screen to the e-mail.

Therefore, according to the communication system, it becomes possible to quickly notify the user of the fact that the scanned image data is deleted from the FTP server 5 and thereby to enable the user to conduct a next appropriate user operation. In other words, it is possible to prevent the downloaded scanned image data from being deleted before re-uploading due to the fact that a re-uploading operation is too troublesome and therefore the user leaves such a re-uploading operation until later.

Although the present invention has been described in considerable detail with reference to certain preferred embodiments thereof, other embodiments are possible.

In the above described embodiment, the MFP generates the notification number as a parameter to be added to the extension reception target URL. However, the index number of the process target record may be added as a parameter to the extension reception target URL. In this case, in the resetting web reception process, the MFP may identify the scanned image data to be re-uploaded based on the information of the index number transmitted from the access source device.

What is claimed is:

1. A reading device, comprising:
a scanner configured to read a document and to generate image data representing the read document;
a storage device configured to store image data downloaded from a server; and
a processor configured to provide:
an uploading unit configured to upload the image data read by the scanner to the server on a network;
a storage time limit setting unit configured to set a storage time limit within which the image data is stored on the server;
a judgment unit configured to judge whether the storage time limit has expired with respect to the image data uploaded on the server;
a data management unit configured to:
  download, from the server, the image data for which the judgment unit judges that the storage time limit has expired;
  store the downloaded image data in the storage device; and
  delete, from the server, the image data corresponding to the downloaded image data
a re-upload unit configured to re-upload, to the server, the downloaded image data designated from data stored in the storage device by a user command inputted by a user; and
a storage time limit re-setting unit configured to set a storage time limit within which the downloaded image data is stored on the server for the downloaded image data to be re-uploaded by the re-upload unit, wherein the judgment unit is configured to judge whether the storage time limit set by the storage time setting unit has expired with respect to the image data uploaded to the server by the uploading unit, and to judge whether the storage time limit set by the storage time re-setting unit has expired with respect to the downloaded image data re-uploaded to the server by the re-upload unit.

2. The reading device according to claim 1, wherein the processor is further configured to provide:

a data deletion unit configured to delete the downloaded image data from the storage device after a predetermined time has elapsed from a time when the downloaded image data is stored in the storage device.

3. The reading device according to claim 2, wherein the storage device is further configured to store the predetermined time, the predetermined time being defined for each of a plurality of types of image data, wherein the data deletion unit is configured to:

judge a type of the downloaded image data stored in the storage device; and delete the downloaded image data from the storage device after the predetermined time corresponding to the type of the downloaded image data to be deleted has elapsed from a time when the downloaded image data is stored in the storage device.

4. The reading device according to claim 1, wherein the processor is further configured to provide:

a notification target setting unit configured to set a notification target to which a notification indicating deletion of the image data corresponding to the downloaded image data from the server is sent, with respect to the image data to be uploaded by the upload unit; and a notifying unit configured, when the image data corresponding to the downloaded image data for which the notification target has been set is deleted from the server by the data management unit, to send the notification to the notification target set for the image data deleted from the server.

5. The reading device according to claim 4, wherein the re-upload unit is configured to re-upload, to the server, the downloaded image data designated from data stored in the storage device in accordance with the user command received from the notification target.

6. The reading device according to claim 5, wherein the storage time limit re-setting unit is configured to set the storage time limit in accordance with a user command received from the notification target.

7. The reading device according to claim 1, wherein the storage time limit setting unit is configured to set the storage time limit in accordance with a user command inputted from a user.

8. The reading device according to claim 1, wherein the scanner is configured to read the document and generate the image data in accordance with a user command inputted externally by a user.

9. A communication system, comprising:

a server; and a reading device according to claim 1, wherein the server and the reading device are connected to each other via a network.

* * * * *